United States Patent
Maruyama et al.

(10) Patent No.: US 11,548,271 B2
(45) Date of Patent: Jan. 10, 2023

(54) LOW ADSORPTION SEALANT FILM, LAMINATED BODY, AND PACKAGING BAG

(71) Applicant: TOYOBO CO., LTD., Osaka (JP)

(72) Inventors: Hiroko Maruyama, Tsuruga (JP); Masayuki Haruta, Tsuruga (JP); Shintaro Ishimaru, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/279,577

(22) PCT Filed: Sep. 30, 2019

(86) PCT No.: PCT/JP2019/038525
§ 371 (c)(1),
(2) Date: Mar. 24, 2021

(87) PCT Pub. No.: WO2020/071315
PCT Pub. Date: Apr. 9, 2020

(65) Prior Publication Data
US 2021/0339514 A1    Nov. 4, 2021

(30) Foreign Application Priority Data

Oct. 3, 2018  (JP) .............................. JP2018-188194
Oct. 3, 2018  (JP) .............................. JP2018-188195

(51) Int. Cl.
*B32B 27/36* (2006.01)
*B65D 30/08* (2006.01)
*B65D 65/40* (2006.01)

(52) U.S. Cl.
CPC .............. *B32B 27/36* (2013.01); *B65D 31/02* (2013.01); *B65D 65/40* (2013.01); *B32B 2307/31* (2013.01); *B32B 2307/538* (2013.01); *B32B 2307/72* (2013.01); *B32B 2439/46* (2013.01)

(58) Field of Classification Search
CPC ................ B32B 27/36; B32B 2307/31; B32B 2307/538; B32B 2307/72; B32B 2439/46; B65D 31/02; B65D 65/40
See application file for complete search history.

(56) References Cited

U.S. PATENT DOCUMENTS

| 2003/0049472 A1 | 3/2003 | Murschall et al. |
| 2016/0108171 A1 | 4/2016 | Haruta et al. |
| 2020/0023626 A1 | 1/2020 | Ishimaru et al. |
| 2021/0101379 A1 | 4/2021 | Ishimaru et al. |

FOREIGN PATENT DOCUMENTS

| JP | H07-132946 A | 5/1995 |
| JP | 2003-528746 A | 9/2003 |
| JP | 3817846 B2 | 9/2006 |
| JP | 2017-165059 A | 9/2017 |
| WO | WO 2014/175313 A1 | 10/2014 |
| WO | WO 2018/021211 A1 | 2/2018 |
| WO | WO 2018/150997 A1 | 8/2018 |

OTHER PUBLICATIONS

Ogawa, "Surface Modification and Adhesion of Plastics," *Journal of the Adhesion Society of Japan*, 38(8): 295-305 (2002).
Japanese Patent Office, International Search Report in International Patent Application No. PCT/JP2019/038525 (dated Nov. 26, 2019).
European Patent Office, Extended European Search Report in European Patent Application No. 19869230.3 (dated Jun. 1, 2022).
Intellectual Property India, Examination Report in Indian Patent Application No. 202147018030 (dated Aug. 5, 2022).
China National Intellectual Property Administration, Office Action in Chinese Patent Application No. 201980064811.9 (dated Nov. 4, 2022).

*Primary Examiner* — Michael C Miggins
(74) *Attorney, Agent, or Firm* — Leydig, Voit & Mayer, Ltd.

(57) ABSTRACT

The invention provides a sealant film that is less likely to adsorb components formed of various types of organic compounds, has excellent heat sealing characteristics at 140° C., while having low heat sealing strength at 100° C. and being less likely for heat sealing layers to adhere to each other even when the film is used as a packaging bag and the content thereof is warmed in boiling water. The sealant film has at least one heat sealing layer consisting of a polyester component, wherein a heat sealing strength of the heat sealing layer being heat sealed to another heat sealing layer at 100° C. and 0.2 MPa for 2 seconds is 0-5 N/15 mm and at 140° C. and 0.2 MPa for 2 seconds is 8-30 N/15 mm, and a film density including all layers is 1.20 or more and less than 1.39.

20 Claims, No Drawings

LOW ADSORPTION SEALANT FILM, LAMINATED BODY, AND PACKAGING BAG

CROSS-REFERENCE TO RELATED APPLICATIONS

This patent application is the U.S. national phase of International Patent Application No. PCT/JP2019/038525, filed Sep. 30, 2019, which claims the benefit of Japanese Patent Application No. 2018-188194, filed Oct. 3, 2018, and Japanese Patent Application No. 2018-188195, filed Oct. 3, 2018, which are incorporated by reference in their entireties herein.

TECHNICAL FIELD

The present invention relates to a sealant film achieving both excellent low adsorption and heat seal, a laminated body using the same, and a packing bag.

BACKGROUND ART

Conventionally, sealant films are used as packaging materials for many articles on the market represented by foods, pharmaceuticals, and industrial products. The innermost layer of a packaging material constituting a packaging bag, a lid member, or the like, is provided with a sealant layer made of a polyolefin resin such as polyethylene and polypropylene, an ionomer, or a copolymer resin such as EMMA which exhibits high sealing strength. These resins are known to be capable of achieving high adhesion strength through heat sealing.

However, an undrawn sealant film made of a polyolefin resin as described in Patent Document 1 easily adsorbs a component made of organic compounds such as fat or oil and flavor material, and accordingly, a packaging material using a sealant film as the innermost layer, namely, a layer to be brought into contact with content, has a disadvantage that the aroma or taste of the content is easily changed. In a case where a sealant layer made of a polyolefin resin is used as the innermost layer of a packaging bag for a chemical product, a pharmaceutical, a food, or the like, it is necessary to take such a measure to include a larger amount of active ingredient of content beforehand, and thus, a sealant layer made of a polyolefin resin is not suitable for the use, in many cases.

On the other hand, a sealant film made of a polyacrylonitrile resin as described in Patent Document 2 has the feature of being less liable to adsorb an organic compound contained in a chemical product, a pharmaceutical, food, or the like. However, a polyacrylonitrile film sometimes fails to obtain good sealing strength because the film has poor heat sealing at 140° C.

In view of such problems, Patent Document 3 discloses a polyester film for sealant use with non-adsorptivity against organic compounds. However, high heat sealing strength at 100° C. of the polyester film of Patent Document 3 facilitates the innermost layer to stick to each other which resulted in a problem that a packing bag made of the polyester film has difficulty opening the bag when the content of the bag is warmed with hot water.

Besides, the applicant of the present application has disclosed in Patent Document 4 a polyester film having a non-adsorbing property for an organic compound used for a sealant. However, in recent years, the speed of automatic filling packaging has been increased to increase productivity, but it has been found that the polyester film of Patent Document 4 cannot adapt to high-speed automatic filling and packaging. The high-speed automatic filling packaging has a short heating time resulted in rising the temperature of the sealant film to only around 120° C. even if the temperature of the heat seal bar is set to 140° C. However, the polyester film of Patent Document 4 has insufficient heat sealing strength at 120° C., which resulted in a problem that the sealed portion of the film has peeled off after heat sealing processing.

PRIOR ART DOCUMENT

Patent Document

Patent Document 1: Japanese Patent No. 3817846B1
Patent Document 2: JPH07-132946A1
Patent Document 3: WO2014/175313A1
Patent Document 4: JP2017-165059A1

SUMMARY OF INVENTION

Technical Problem

An object of the present invention is to solve the problems of the conventional technique. That is, a gist of the present invention is to provide a sealant film (A) with less liable to adsorb various organic compounds and with excellent heat sealing at 140° C.

The first invention of the present invention provides the sealant film (A) with low heat sealing strength at 100° C. thereby the heat sealing layers are less liable to the adhesive with each other when a content of a packing bag made of the film is heated with hot water.

The second invention of the present invention provides the sealant film (A) with excellent heat sealing at 120° C. thereby the film exhibits sufficient heat sealing strength when the film is applied to the high-speed automatic filling packaging.

Also, the present invention provides a laminated body including at least one layer of a sealant film of the first invention or the second invention of the present invention, and a packing bag using the same.

Solutions to the Problems

Hereinafter, a sealant film below 1 is named as the first invention and a sealant film below 2 is named as the second invention. Unless otherwise specified, the items of the present invention are applied to both inventions.

The present invention has the following configurations.
1. A sealant film having low adsorption comprising;
    the film has at least one heat sealing layer consisting of a polyester component,
    wherein the film satisfies following requirements (1) to (3):
    (1) a heat sealing strength of the heat sealing layer being heat sealed to another heat sealing layer at 100° C. and 0.2 MPa for 2 seconds is 0 N/15 mm or more and 5 N/15 mm or less;
    (2) a heat sealing strength of the heat sealing layer being heat sealed to another heat sealing layer at 140° C. and 0.2 MPa for 2 seconds is 8 N/15 mm or more and 30 N/15 mm or less;
    (3) a film density including all layers is 1.20 or more and less than 1.39.
2. A sealant film having low adsorption comprising;
    the film has at least one heat sealing layer consisting of a polyester component, wherein the film satisfies following requirements (4) to (6):

(4) a heat sealing strength of the heat sealing layer being heat sealed to another heat sealing layer at 120° C. and 0.2 MPa for 2 seconds is 4 N/15 mm or more and 15 N/15 mm or less;
(5) a heat sealing strength of the heat sealing layer being heat sealed to another heat sealing layer at 140° C. and 0.2 MPa for 2 seconds is 8 N/15 mm or more and 30 N/15 mm or less;
(6) an oxygen atom abundance ratio of the heat sealing layer determined by X-ray Photoelectron Spectroscopy (ESCA) is 26.6% or more and 31.0% or less.
3. The sealant film having low adsorption according to above 1 or 2,
wherein an average length R Sm of a surface roughness element of the film measured by a three dimensional surface roughness tester is 18 μm or more and 29 μm or less.
4. The sealant film having low adsorption according to any one of above 1 to 3,
wherein the coefficient of dynamic friction between the heat sealing surfaces is 0.30 or more and 0.80 or less.
5. The sealant film having low adsorption according to any one of above 1 to 4,
wherein a component constituting the film is a polyester containing ethylene terephthalate as a main component.
6. The sealant film having low adsorption according to any one of above 1 to 5,
wherein a monomer constituting a polyester component constituting the heat sealing layer includes diol monomer component other than ethylene glycol,
wherein the diol monomer component is at least one selected from the group consisting of neopentyl glycol, 1,4-cyclohexanedimethanol, 1,4-butanediol, and diethylene glycol.
7. The sealant film having low adsorption according to any one of above 1 to 6,
wherein the film has a heat shrinkage ratio of 0% or more and 10% or less both in a longitudinal direction and widthwise direction when treated in hot water at 80° C. for 10 seconds.
8. A laminated body including at least one layer of the heat sealant film according to any one of above 1 to 7.
9. A packing bag, wherein at least a part of the packing bag includes the sealant film according to any one of above 1 to 7, or the laminated body according to claim 8.

Advantageous Effects of Invention

The sealant film of the present invention not only exhibits high heat sealing strength at 140° C., but also is less liable to adsorb various organic compounds, and therefore, is capable of hygienically packaging an article which contains oil or a flavor material, such as a chemical product, a pharmaceutical, or food. The sealant film of the first invention has low heat sealing strength at 100° C. thereby the heat sealing layers are less liable to adhesive with each other when a content of a packing bag made of the film is heated with hot water. The sealant film of the second invention has excellent heat sealing at 140° C. and low temperature heat sealing at 120° C. thereby the film exhibits sufficient heat sealing strength when the film is applied to the high-speed automatic filling packaging.

Furthermore, the present invention provides a laminated body including at least one layer of the heat sealant film of the first invention or the second invention. The present invention provides a packing bag including the laminated body.

DESCRIPTION OF EMBODIMENTS

A sealant film of the first invention has low adsorption and has at least one heat sealing layer consisting of a polyester component, and the film satisfies the following requirements (1) to (3):
(1) a heat sealing strength of the heat sealing layer being heat sealed to another heat sealing layer at 100° C. and 0.2 MPa for 2 seconds is 0 N/15 mm or more and 5 N/15 mm or less;
(2) a heat sealing strength of the heat sealing layer being heat sealed to another heat sealing layer at 140° C. and 0.2 MPa for 2 seconds is 8 N/15 mm or more and 30 N/15 mm or less;
(3) a film density including all layers is 1.20 or more and less than 1.39.

Hereinafter, the present specification describes properties of the sealant film of the present invention, layer structure of the film, a ratio of layers, raw materials constituting the sealant film, the production method of the sealant film, kinds of contents, the structure of the packaging bag, and the production method of the packaging bag.

1. Properties of the Sealant Film
1.1. Heat Sealing Strength at 100° C.

The heat sealant film of the first invention requires 0 N/15 mm or more and 5 N/15 mm or less of the heat sealing strength of the heat sealing layer being heat sealed with another heat sealing layer at 100° C. and 0.2 MPa for 2 seconds.

The sealant film having its heat sealing strength at 100° C. of exceeding 5 N/15 mm is not suitable for the packaging bag because the packing bag made of such a film facilitates the innermost layer to stick to each other when warming its content and which reduces the open easiness of the bag. The heat sealing strength at 100° C. is preferably 4.5N/15 mm or less, more preferably 4.0 N/15 mm or less.

1.2. Heat Sealing Strength at 120° C.

The heat sealant film of the second invention requires 4 N/15 mm or more and 15 N/15 mm or less of the heat sealing strength of the heat sealing layer being heat sealed with another heat sealing layer at 120° C. and 0.2 MPa for 2 seconds.

The sealant film having its heat sealing strength at 120° C. of less than 4 N/15 mm cannot increase the productivity of the packaging bag because of heat sealing strength poverty when the film is applied to the high-speed automatic filling packaging. The sealant film prefers to have larger heat sealing strength at 120° C. The upper limit of the heat sealing strength under the technological level at the time of the present invention was made is about 15 N/15 mm and the upper limit satisfies practical use. The heat sealing strength at 120° C. is preferably 5 N/15 mm or more, more preferably 6 N/15 mm or more.

1.3. Heat Sealing Strength at 140° C.

The heat sealant film of the second invention requires 8 N/15 mm or more and 15 N/15 mm or less of the heat sealing strength of the heat sealing layer being heat sealed with another heat sealing layer at 140° C. and 0.2 MPa for 2 seconds.

The sealant film having its heat sealing strength at 140° C. of less than 8 N/15 mm has difficulty to use for the packaging bag because a sealed portion of the film has peeled off easily. The sealant film prefers to have larger heat sealing strength at 140° C. The achievable upper limit of the heat sealing strength under the technological level at the time the present invention was made is about 30 N/15 mm. The heat sealing strength at 140° C. is preferably 9 N/15 mm or more, more preferably 10 N/15 mm or more.

1.4 Density

The heat sealant film of the first invention requires a film density including all layers of 1.20 or more and less than 1.39. The density of the film including all layers, the adsorption, heat resistance, and the heat sealing strength at 140° C. are correlated. The higher density provides the sealant film with excellent low adsorption and heat resistance. Because the higher density tends to higher crystallinity and the higher crystallinity improves chemical resistance and heat resistance. Therefore, less than 1.20 of the film density including all layers deteriorates the chemical resistance which resulted in higher adsorption and lower heat resistance thereby the film easily forms holes. Accordingly, the film is not suitable for the packing bag.

Also, 1.39 or more of the density provides excellent heat resistance but decreasing heat sealing at 140° C. and therefore the film is not suitable for sealant film. The density of the present inventive film is preferably 1.25 or more and 1.38 or less, and more preferably 1.30 or more and 1.37 or less.

1.5. Average Length R Sm of a Surface Roughness Element of the Heat Sealing Layer The sealant film of the present invention preferably has 18 μm or more and 29 μm or less of an average length R sm of a surface roughness element of the heat sealing layer measured under the conditions of 0.250 mm of a cutoff and 0.2 mm/sec of a measurement speed. The average length R sm of a surface roughness element of the heat sealing layer is correlated with the heat sealing strength at 100° C. and the coefficient of dynamic friction between the heat sealing surfaces of the films. The longer average length R sm of a surface roughness element of the heat sealing layer reduces roughness of the heat sealing surface to become smoothing the surface and thereby contact area of the surface is increased which resulted in increasing the heat sealing strength at 100° C. and the coefficient of dynamic friction between the heat sealing surfaces.

The sealant film having its average length R sm of a surface roughness element of the heat sealing layer of over 29 μm increases the heat sealing strength at 100° C., which is not suitable for the packaging bag because the packing bag made of such a film facilitates the innermost layer to stick to each other when warming its content and resulted in reducing the open easiness of the bag. Conversely, The sealant film having its average length R sm of a surface roughness element of the heat sealing layer of less than 18 μm drastically decreases contact area between the heat sealing surfaces to provide lower heat sealing strength at 140° C., which is not suitable for the packaging bag. The average length R sm of a surface roughness element of the heat sealing layer is preferably 19 μm or more and 28 μm or less, more preferably 20 μm or more and 27 μm or less.

1.6. Coefficient of Dynamic Friction of the Heat Sealing Layer

The coefficient of dynamic friction of the sealant film of the present invention is preferably 0.30 or more and 0.80 or less.

Less than 0.30 of the coefficient of dynamic friction decreases handling-ability because the film excessively slips. Conversely, over 0.80 of the coefficient of dynamic friction reduces winding quality because the film exhibits poor slipping to increase the occurrence of wrinkles when winding the film on the roll. The coefficient of dynamic friction of the heat sealing layer is preferably 0.35 or more and 0.75 or less, more preferably 0.40 or more and 0.70 or less.

1.7. Oxygen Atom Abundance Ratio on the Surface of the Heat Sealing Layer

The sealant film of the second invention requires 26.6% or more and 31.0% or less of oxygen atom abundance ratio on the surface of the heat sealing layer determined by X-ray Photoelectron Spectroscopy (ESCA). Non-patent literature 1 discloses that introducing oxygen containing groups on the surface by surface treatment increases the deviation of charge density to strengthen the intermolecular force and thereby improving adhesive strength. This is because adhesion mainly on plastics attributes to the bond by intermolecular attraction. It is considered that the higher oxygen atom abundance ratio on the surface of the heat sealing layer enlarges deviation of charge density and resulted in strengthen the heat sealing strength at 120° C. Therefore, less than 26.6% of oxygen atom abundance ratio on the surface of the heat sealing layer reduces the heat sealing strength at 120° C. and resulted in a shortage of the heat sealing strength when the film is applied to the high-speed automatic filling packaging. And exceeding 31.0% of oxygen atom abundance ratio on the surface of the heat sealing layer enlarges deviation of charge density which facilitates adhesion under normal temperature and resulted in blocking of the winded films which cause reduction of smooth wound off of the sheet from the roll. The oxygen atom abundance ratio on the surface of the heat sealing layer is preferably 26.7% or more and 30.5% or less, more preferably 26.8% or more and 30.0% or less.

1.8. Wet Tension on the Surface of the Heat Sealing Layer

The sealant film of the second invention has wet tension on the surface of the heat sealing layer of preferably 38 mN/m or more and 55 mN/m or less. Higher oxygen atom abundance ratio on the surface of the heat sealing layer increases wet tension of the surface of the heat sealing layer which increases the heat sealing strength at 120° C. Less than 38 mN/m of the wet tension on the surface of the heat sealing layer decreases the heat sealing strength at 120° C. which resulted in a shortage of the heat sealing strength. Conversely, exceeding 55 mN/m of the wet tension on the surface of the heat sealing layer makes winded films blocking each other which resulted in the difficult unwinding of the film from the roll. The wet tension on the surface of the heat sealing layer is preferably 39 mN/m or more and 54 mN/m or less, more preferably 40 mN/m or more, and 53 mN/m or less.

1.9. Heat Shrinkage Ratio

The sealant film has a heat shrinkage ratio of preferably 0% or more and 10% or less both in a longitudinal direction and widthwise direction when treated in hot water at 80° C. for 10 seconds.

Exceeding 10% of the heat shrinkage ratio enlarges the shrink of the film when heat sealing the film which resulted in reducing flatness of the film after sealing. Conversely, below zero of the heat shrinkage ratio means elongation in a film becoming difficult for the film to maintain its original shape as in the case of a film with a high shrinkage ratio which is an unpreferable case. The upper limit of the heat shrinkage ratio is preferably 9% or less, and more preferably 8% or less.

1.10. Haze

The haze of the sealant film of the present invention is preferably 0% or more and less than 10%. The haze of 10% or more reduces the transparency of the film which resulted in hamper visual recognition of contents inside the packaging bag, which is an unpreferable case. The upper limit of the haze is preferably 9% or less, and more preferably 8% or less.

1.11. Thickness of the Film

The present invention does not limit the thickness of the film but the thickness is preferably 3 μm or more and 200 μm or less.

A film thickness thinner than 3 μm is not preferred for causing a lack of heat sealing strength or making a process such as printing difficult. A film thickness of thicker than 200 μm may also be possible but is not much preferred because it increases the weight of the film to be used, to increase a chemical cost. The thickness of the film of the present invention is preferably 5 μm or more and 160 μm or less, and more preferably 7 μm or more and 120 μm or less.

2. Structure of the Sealant Film

2.1. Layer Structure of the Sealant Film, Ratio of the Heat Sealing Layer

The layer structure of the sealant film of the present invention may be a single layer of the heat sealing layer or maybe a laminated structure of two or more layers. Because the heat sealing is inconsistent with and the heat resistance, a preferable structure of the first invention is a laminated structure which can improve the heat resistance by a layer other than the heat sealing layer (the layer may be called as "heat sealing layer") while maintaining the heat sealing at 140° C. provided by the heat sealing layer. Also, for the same reason above, a preferable structure of the second invention is a laminated structure which can improve the heat resistance by a layer other than the heat sealing layer while maintaining the heat sealing at 120° C. of the heat sealing layer.

A preferable layer structure is having the heat sealing layer on at least one surface of the film, such as two layer constitution of heat sealing layer/heat resistant layer, three layer constitution of heat sealing layer/heat resistant layer/heat sealing layer, and more preferable layer structure is two layer constitution of heat sealing layer/heat resistant layer.

A ratio of the heat sealing layer in the laminated constitution of the present inventive sealant film is 20% or more and 80% or less. A ratio of the heat sealing layer of less than 20%, which is not preferable, may reduce the heat sealing strength of the film. A ratio of the heat sealing layer of over 80%, which is not preferable, increases the heat sealing but decreases the heat resistance. The ratio of the heat sealing layer is preferably 30% or more and 70% or less.

2.2. Laminating Method

A sealant film of the present invention needs to have the heat sealing layer located on at least one surface of the film when the film has a laminated structure. A publicly-known method such as in-line type film lamination by co-extrusion or lamination after forming film can be employed for laminating the film with a layer made of resin raw material (resin layer). The former laminating method includes a co-extrusion by a multi-manifold T die or an inflation method and the latter laminating method includes adhesion by a wet or dry lamination or a hot melt. The dry laminating maybe use commercially available adhesive agents for dry lamination. Typical examples of the adhesive agents include DICDRY (resister trademark) LX-703VL manufactured by DIC, KR-90 manufactured by DIC, TAKENATE (resister trademark) A-4 manufactured by Mitsui Chemical, and TAKELAC (resister trademark) A-905 manufactured by Mitsui Chemical. The heat sealing layer may be unstretched, uniaxial drawing, or biaxial stretching. In terms of strength, the heat sealing layer is preferably stretched at least in one direction (uniaxial drawing), and more preferably biaxial stretching. A preferable production method by biaxial stretching will be described later.

2.3. Surface Treatment of the Heat Sealing Layer

The sealant film of the first invention can be provided with a layer processed by coating treatment or flame treatment regardless to the heat sealing layer or a layer other than the heat sealing layer. And the sealant film may be vapor-deposited with inorganic substances. Corona treatment and plasma treatment are not preferable to apply to the heat sealing layer because the treatment may provide the heat sealing strength at 100° C. to increase the strength 5 N/15 mm or more.

The sealant film of the second invention can be provided with a layer processed by corona treatment, plasma treatment, coating treatment, or flame treatment regardless to the heat sealing layer or a layer other than the heat sealing layer. And the sealant film may be vapor-deposited with inorganic substances. Corona treatment and plasma treatment are preferably processed on the surface of the heat sealing layer because the treatment can improve the oxygen atom abundance ratio on the surface. Corona treatment is particularly preferably applied in the present invention.

2.4. Other Layer Structure, a Ratio of Layers

In addition to the heat sealing layer and the heat resistant layer, the heat sealant film of the present invention can take a laminated structure of three or more layers including at least one inorganic thin film layer for improving barrier property. The inorganic thin film layer can provide barrier property to the film. The inorganic thin film layer and the heat resistant layer can take any position in the layer but the heat sealing layer requires to be positioned at the outermost layer for obtaining the heat sealing strength. A preferable layer configuration is positioning the sealing layer and the inorganic thin film layer at outermost layers and positioning the heat resistant layer at the intermediate layer.

Also, the layer structure of the laminated body may include one or more of a layer other than the heat sealing layer, the heat resistant layer, and the inorganic thin film layer. Specific examples of the other layer include an anchor coat layer provided under the inorganic thin film layer, an overcoat layer provided over the inorganic thin film layer, and a resin layer (film) other than the resin layer consisting of the sealant film of the present invention.

The thickness of the inorganic thin film layer is preferably 2 nm or more and 100 nm or less (A ratio of the thickness of the inorganic thin film layer in the overall thickness of the laminated body is negligibly small). A thickness of the inorganic thin film layer of less than 2 nm is not preferable because the layer becomes difficult to satisfy the gas barrier property. Conversely, a thickness of the inorganic thin film layer of over 100 nm is not preferable because the layer cannot provides gas barrier property improvement corresponds to the thickness of the film but the production cost is increased. The thickness of the inorganic thin film layer is preferably 5 nm or more and 97 nm or less, more preferably 8 nm or more and 94 nm or

3. Raw Material Consisting of the Sealant Film

3.1. Kinds of the Raw Materials Consisting of the Sealant Film

The sealant film of the present invention requires at least one heat sealing layer consisting of a polyester component. The polyester component of the heat sealing layer preferably has 2 or more and 6 or fewer oxygen atoms per one ester unit. Particularly, the present invention prefers polyester raw material containing ethylene terephthalate as a main constituent component. Herein, "as a main constituent component" means the content is 50% by mol or more in 100% by mol of the total amount of the constituent component. The polyester of the present invention preferably contains one or more monomer components which can be amorphous (hereinafter referred to as amorphous components) because the presence of an amorphous component improves the heat sealing strength.

Examples of a monomer of a dicarboxylic acid component that can be amorphous may include isophthalic acid, 1,4-cyclohexane dicarboxylic acid, and 2,6-naphthalene dicarboxylic acid.

Further, examples of monomer of a diol component which can be an amorphous component may include neopentyl glycol, 1,4-cyclohexanedimethanol, diethylene glycol, 2,2-diethyl 1,3-propanediol, 2-n-butyl-2-ethyl-1,3-propanediol, 2,2-isopropyl-1,3-propanediol, 2,2-di-n-butyl-1,3-propanediol, and hexanediol.

Among these amorphous dicarboxylic acid components and diol components, isophthalic acid, neopentyl glycol, 1,4-cyclohexanedimethanol, and diethylene glycol are preferably used because these components improve the amorphousness of the film which helps to improve the heat sealing strength easily.

In the present invention, the constituent component can include a component other than ethylene terephthalate or amorphous components. Examples of dicarboxylic acid components constituting the polyester may include aromatic dicarboxylic acids such as orthophthalic acid; aliphatic dicarboxylic acids such as adipic acid, azelaic acid, sebacic acid, and decane dicarboxylic acid; and alicyclic dicarboxylic acids. However, a polycarboxylic acid having three or more valences (for example, trimellitic acid, pyromellitic acid, and anhydrides thereof) is preferably not contained in the polyester.

In addition to those described above, examples of a component constituting the polyester may include long-chain diols such as 1,4-butanediol, aliphatic diols such as hexanediol, and aromatic diols such as bisphenol A. Among them, 1,4-butanediol is preferably contained. Further, as a component constituting the polyester, a polyester elastomer containing ε-caprolactone, tetramethylene glycol, or the like, may be contained. These components have the effect of lowering the melting point of the film and are therefore preferred as a component of the heat sealing layer. However, it is preferred that the polyester do not contain a diol having 8 or more carbon atoms (e.g., octanecliol, etc.), or a polyalcohol having 3 or more valences (e.g., trimethylolpropane, trimethylolethane, glycerin, diglycerin, etc.) which lowers film strength significantly.

The sealant film of the present invention may be added with various additives such a wax, an antioxidant, an antistatic agent, a crystal nucleating agent, a viscosity reducing agent, a thermal stabilizer, a coloring pigment, an anti-coloring agent, and an ultraviolet absorber. Also, fine particles as a lubricant for improving the smoothness of the film are preferably added to at least a surface layer of the film. As the fine particles, those of an arbitrary substance may be selected. Examples of inorganic fine particles may include those of silica, alumina, titanium dioxide, calcium carbonate, kaolin, barium sulfate, etc., and examples of organic fine particles may include those of acrylic resin particles, melamine resin particles, silicone resin particles, cross-linked polystyrene particles, etc. The average particle size of the fine particles may be appropriately selected according to needs within a range of 0.05 to 3.0 μm as measured by the Coulter counter. Among these particles, fine particles of silica or calcium carbonate are preferable, and silica is more preferable for obtaining both smoothness of the film and transparency. A preferable content of the particles cannot uniquely determine because the content thereof varies depending on selected particle kinds. The content of silica particles is preferably 200 ppm or more and 1000 ppm or less, more preferably 300 ppm or more and 900 ppm or less, further preferably 400 ppm or more and 800 ppm or less. The silica content of less than 200 ppm may not provide sufficient improvement of the smoothness of the film. The silica content of over 1000 ppm may provide an unpreferable increase of the haze.

As a method of blending the particles in the sealant film of the present invention, for example, they can be added in an arbitrary step in the production of the polyester resin, but they are preferably added in a step of esterification, or a step before the start of polycondensation reaction and after completion of ester exchange reaction as slurry dispersed in ethylene glycol, etc., followed by carrying out polycondensation reaction. Further, the method may also include such as a method in which slurry of particles dispersed in ethylene glycol, water, other solvent or the like and raw materials of polyester resin are mixed using a kneading extruder with a vent, or a method in which dried particles and raw materials of polyester resin are mixed using a kneading extruder.

The sealant film of the present invention can form a laminated structure and can use the same raw material for a layer other than the heat sealing layer as the raw material for the heat sealing layer. As an example, a polyester layer may be formed by composition different from the composition of the heat sealing layer using preferable constituents of the heat sealing layer.

3.2 Content of Polyester Raw Materials Contained in Heat Sealing Layer

A polyester used for the heat sealing layer of the present invention preferably contains 20% by mol or more of dicarboxylic acid monomer and/or diol monomer that is to be a component other than terephthalic acid and ethylene glycol that constitute ethylene terephthalate. This content is more preferably 25% by mol or more and particularly preferably 30% by mol or more. The higher content of the amorphous component may decrease density while easily increasing the heat sealing strength. Also, the upper limit of the contained monomer that is to be a component other than the ethylene terephthalate is 50% by mol.

Less than 30% by mol of monomer component other than the ethylene terephthalate contained in the heat sealing layer is unpreferable because the molten resin crystalizes in subsequent stretching and heat fixing process, even though a molten resin is quenched and solidified after extruded from a die, which results in difficulty for the heat sealing strength at 140° C. to be 8 N/15 mm or more.

On the other hand, exceeding 50% by mol of monomer component other than the ethylene terephthalate contained in the heat sealing layer may cause difficulty to proper heat sealing because the excess amount of monomer may extremely lower the heat resistance of the heat seal layer which resulted in blocking the area around a sealed portion (a phenomenon in which a region broader than intended is sealed due to heat conduction from a heating member) when heat sealing. A content of monomer component other than ethylene terephthalate is preferably 48% by mol or less and particularly preferably 46% or less.

3.3. Content of Raw Materials Contained in Heat Resistant Layer

The sealant film of the present invention may have a heat resistant layer. And polyester used for the heat resistant layer may contain preferably 9% by mol or more of dicarboxylic acid and/or diol monomer that is to be a component other than terephthalic acid and ethylene glycol that constitute ethylene terephthalate. A content of the dicarboxylic acid and/or the diol monomer component is more preferably 10% by mol or more, particularly preferably 11% by mol or more, and the upper limit thereof is 20% by mol.

Lower than 9% by mol of the monomer that is to be a component other than ethylene terephthalate contained in the heat resistant layer is unpreferable because of a difference of heat shrinkage ratio between the heat resistant layer and a sealing layer becomes large which enlarges a curl size of the laminated body. Increasing a difference of the monomer content between the heat sealing layer and the heat resistant layer increases a difference in the heat shrinkage ratio of each layer during heat fixing which enlarges shrinkage on a side of the heat sealing layer and thus the curl size becomes large even though quenching after the heat fixing is intensified.

On the other hand, it is not preferable that the monomer that is to be a component other than the ethylene terephthalate contained in the heat resistant layer is 20% by mol or more because this deteriorates the heat resistance of the laminated body such that the heat applied during the heat sealing causes a hole. The content of the monomer that is to be a component other than the ethylene terephthalate is more preferably 19% by mol or less and particularly preferably 18% or less.

Further, concerning the content of the monomer for controlling a curl, this monomer is to be a component other than the ethylene terephthalate, a difference of the content between the heat sealing layer and the heat resistant layer is more preferably 10% by mol or more and 45% by mol or less, further preferably 11% by mol or more and 44% by mol or less in addition to the respective monomer content in each layer described above.

3.4. Kinds of Raw Materials and Composition of an Inorganic Thin Film Layer

The sealant film of the present invention may contain an inorganic thin film layer. The raw material for the inorganic thin film layer is not particularly limited and any known materials can be used. Kinds of raw materials can be appropriately selected to satisfy properties such as gas barrier property. Examples of the raw material for the inorganic thin film layer include metals such as silicon, aluminum, tin, zinc, iron, and manganese, and inorganic compounds containing one or more of these metals. Also, examples of inorganic compounds include such as oxides, nitrides, carbides, and fluorides. These inorganic substances or inorganic compounds may be used alone or in a combination with two or more of them. In particular, silicon oxide and aluminum oxide as a single substance (one element) or in combination (binary elements) is preferably used for improving the transparency of the laminated body. The inorganic compound consisting of the binary elements of silicon oxide and aluminum oxide contains an aluminum oxide of preferably 20% by mass or more and 80% by mass or less, more preferably 25% by mass or more, and 70% by mass or less. The inorganic thin film layer containing less than 20% mass of aluminum oxide, which is unpreferable, may decrease the density of the inorganic thin film layer which may decrease the gas barrier property. Further, the inorganic thin film layer containing more than 80% by mass of aluminum oxide, which is also unpreferable, may lower the flexibility of the inorganic thin film layer to increase the possibility of cracks, and which may result in lowering the gas barrier property.

The element ratio of oxygen/metal of the metal oxide used in the inorganic thin film layer is preferably 1.3 or more and less than 1.8 for obtaining less gas barrier property variation which enables to provide excellent gas barrier properties all the time. The element ratio of oxygen/metal can be obtained by measuring the amounts of each element of oxygen and metal by X-ray photoelectron spectroscopy (XPS) and calculating the element ratio of oxygen/metal.

4.5. Manufacturing Method of the Sealant Film 4.1. Melt Extrusion

The sealant film of the present invention can be manufactured by melt-extruding the polyester raw materials described in the above Section 3 "Raw material consisting the sealant film." with the extruder to form an unstretched laminated film and the unstretched laminated film is then uniaxially or biaxially stretched by the prescribed method described below. A film obtained by biaxial stretching is more preferred. The polyester can be obtained, as described above, through polycondensation of a dicarboxylic acid component and a diol component whose kinds and amounts are selected to make the polyester appropriately contain a monomer that can be a component other than ethylene terephthalate. Also, the present invention can use a mixture of two or more kinds of polyester chips as a raw material of the film.

When raw material resins are melt-extruded, it is preferable to dry polyester raw material of each layer by using a drier such as a hopper drier or a paddle drier, or a vacuum dryer. The polyester raw material of each layer is dried as described above, then melted at a temperature of 200 to 300° C. and extruded into a film, by using an extruder. At the extrusion, any existing method can be adopted, such as a T-die method or a tubular method.

Subsequently, the laminated film that is molten through extrusion can be quenched to give an unstretched laminated film. A method of quenching the molten resin that can be suitably adopted is a method of obtaining a substantially unoriented resin sheet by casting the molten resin on a rotary drum from a spinneret to quench and solidify the cast resin. The film may be stretched in at least either one of the lengthwise (longitudinal) direction and the lateral (widthwise) direction. That is, uniaxial stretching or biaxial stretching is preferable. Hereinafter described will be a sequential biaxial stretching method via lengthwise stretching-lateral stretching in which lengthwise stretching is performed first and then lateral stretching is performed. An adopted method, however, may be a lateral stretching-lengthwise stretching method in which the order of stretching is reversed because the main orientation direction is only changed. Alternatively, a simultaneous biaxial stretching method may be adopted.

4.2. Lengthwise Stretching

Stretching in the lengthwise direction may be performed by introducing an unstretched film into a lengthwise stretching machine in which a plurality of roll groups are successively arranged. In the lengthwise stretching, it is preferable to perform preliminary heating with a preheating roll until the film temperature reaches 65° C. to 90° C. The film having a temperature of lower than 65° C. is not preferred because the film becomes hard to be stretched during the stretching in the lengthwise direction and thus easily causes breakage. The film having a temperature of higher than 90° C. is not preferred because the film easily adhesively attaches to a roll and thus winds around the roll or easily makes the roll dirty in continuous production.

When the film temperature reaches 65° C. to 90° C., the lengthwise stretching is performed. The lengthwise stretch ratio may be set at 1 time or more and 5 times or less. A lengthwise stretch ratio of 1 time means no lengthwise stretching performed so that the lengthwise stretch ratio is to be set at 1 time to obtain a lateral uniaxially stretched film and is to be set at 1.1 times or more to obtain a biaxially stretched film. The upper limit of the lengthwise stretch ratio may be any value. Too high a lengthwise stretch ratio, however, makes lateral stretching hard and thus easily causes breakage, so that the lengthwise stretch ratio is preferably 5 times or less.

Loosening the film in the longitudinal direction after the lengthwise stretching (relaxation in the longitudinal direction) enables a reduction in the shrinkage ratio of the film in the longitudinal direction that has been generated by the lengthwise stretching. Further, the relaxation in the longitudinal direction enables mitigation of the bowing phenomenon (distortion) that occurs in a tenter. This is because the film is heated while gripped at both ends thereof in the film widthwise direction in subsequent processes such as lateral stretching and final heat treatment so that only a center portion of the film is shrunk in the longitudinal direction. The relaxation ratio in the longitudinal direction is preferably 0% or more and 70% or less (a relaxation ratio of 0% means no relaxation performed). The upper limit of the relaxation ratio in the longitudinal direction is determined according to raw materials used and conditions for the lengthwise stretching so that the relaxation cannot be performed exceeding this upper limit. In a sealant according to the present invention, the upper limit of the relaxation ratio in the longitudinal direction is 70%. The relaxation in the longitudinal direction can be performed by heating the lengthwise stretched film at a temperature of 65° C. to 100° C. or lower and adjusting the difference in the speed of rolls. As heating means, any of a roll, near-infrared light, far-infrared light, and a hot air heater can be employed. The relaxation in the longitudinal direction can not only be performed directly after the lengthwise stretching but can also be performed by narrowing a gap between clips in the longitudinal direction during, for example, the lateral stretching (including a preheating zone) or the final heat treatment in the relaxation at this timing, both ends in the film widthwise direction are also relaxed in the longitudinal direction so that bowing distortion is mitigated. Thus, the relaxation in the longitudinal direction can be performed at any timing.

After the relaxation in the longitudinal direction (or the lengthwise stretching when the relaxation is not performed), the film is preferably once cooled and is preferably cooled with a cooling roll having a surface temperature of 20 to 40° C.

4.3. Lateral Stretching

It is preferable after the lengthwise stretching to perform the lateral stretching at a stretch ratio of about 3 to 5 times at 65° C. to 110° C. with the film gripped by clips at both end edges in the widthwise direction in a tenter. Before performing the stretching in the lateral direction, it is preferable to perform preliminary heating, and the preliminary heating may be performed until the surface temperature of the film reaches 75° C. to 120° C.

After the lateral stretching, it is preferable to let the film pass through an intermediate zone in which active heating operation is not performed. A final heat treatment zone following a lateral stretch zone in the tenter has a higher temperature than does the lateral stretch zone, so that heat of the final heat treatment zone (a hot blast itself or radiation heat) would flow into a lateral stretching process without the intermediate zone. Without the intermediate zone, the temperature in the lateral stretch zone would not be stabilized and therefore the thickness accuracy of the film is deteriorated and the physical properties of the film, such as heat sealing strength and the shrinkage ratio may be varied. Therefore, the final heat treatment is preferably conducted after passing the laterally stretched film through the intermediate zone for a prescribed time. It is important, in this intermediate zone, to block an accompanying flow from the passing film and a hot blast from the lateral stretch zone and the final heat treatment zone in such a manner that a piece of strip-shaped paper is hung in the almost completely vertical direction when the paper is hung down without the film passing through the intermediate zone. A sufficient passing time through the intermediate zone is about 1 second to 5 seconds. A passing time of less than 1 second indicates the insufficient length of the intermediate zone which resulted in insufficient heat blocking effect. On the other hand, a longer intermediate zone is more preferred but too long an intermediate zone requires larger facility. Therefore, the sufficient passing time is about 5 seconds.

4.4. Final Heat Treatment

It is preferable to perform a heat treatment at a lateral stretching temperature or higher and 250° C. or lower in the final heat treatment zone after the film passes through the intermediate zone. A heat treatment decreases the heat shrinkage ratio of the film but the heat treatment exhibits no effect when the heat treatment temperature is lower than the lateral stretching temperature. A heat treatment temperature lower than the lateral stretching temperature is not preferred because the 80° C. hot-water shrinkage ratio of the film becomes higher than 10% and the film is easily wrinkled during heat sealing. The higher heat treatment temperature decreases the film shrinkage rate but the heat treatment temperature of higher than 250° C. is not preferable because the film may be melted and then dropped into a tenter during the final heat treatment. A heat treatment temperature range is preferably 120° C. or higher and 240° C. or lower, and particularly preferably 150° C. or higher and 220° C. or lower.

Further, the higher heat treatment temperature improves the heat sealing strength at 140° C., but the average length R Sm of a surface roughness element of the heat sealing layer becomes longer because the surface is smoothed by melting the heat sealing layer. Therefore, the higher heat treatment temperature increases the heat sealing strength at 100° C., which deteriorates the smoothness of the film. The heat sealing strength at 140° C. and the average length R Sm of a surface roughness element of the heat sealing layer are decided by not only the heat treatment temperature but also the content of polyester raw materials, the lengthwise stretching conditions, and lateral stretching conditions. Therefore, the preferable condition range of the heat treatment temperature cannot be unambiguously determined but in the raw material composition and the film forming conditions of the examples described later, the heat treatment temperature is preferably 170° C. or higher and 210° C. or lower, and more preferably 180° C. or higher and 200° C. or lower. The heat treatment temperature of lower than 170° C. may result in insufficient heat sealing strength at 140° C. as unpreferable. Also, the heat treatment temperature of over 210° C. may result in increasing the heat sealing strength at 100° C. and deteriorating smoothness of the film as unpreferable.

It is possible to reduce the shrinkage ratio in the widthwise direction by shortening the distance between the clips in the tenter at any rate during the final heat treatment (relaxation in the widthwise direction). Therefore, it is preferable to perform the relaxation in the widthwise direction in a range of 0% or more and 10% or less in the final heat treatment (a relaxation ratio of 0% means no relaxation performed). The higher relaxation ratio in the widthwise direction lowers the shrinkage ratio. However, the upper limit of the relaxation ratio (the shrinkage ratio of the film in the widthwise direction right after the widthwise stretching) is determined according to raw materials used, conditions for the stretching in the widthwise direction, and the heat treatment temperature so that the relaxation cannot be performed exceeding this upper limit. In the sealant film of the present invention, the upper limit of the relaxation ratio in the widthwise direction is 10%.

The passing time through the final heat treatment zone is preferably 2 seconds or more and 20 seconds or less. If the passing time is 2 seconds or less, the film passes through the heat treatment zone without the surface temperature of the film reaching a set temperature so that the heat treatment becomes meaningless. The heat treatment enhances its effect as the passing time becomes long so that the passing time is preferably 2 seconds or more, further preferably 5 seconds or more. Long passing time, however, requires a large facility. For this reason, a sufficient passing time is 20 seconds or less.

4.5. Cooling

After passing through the final heat treatment, it is preferred that the film is cooled by cooling air of 10° C. or higher and 30° C. or lower. At this time, it is preferable to enhance a cooling efficiency by lowering the temperature of the cooling wind or increasing its speed in such a manner that the actual temperature of the film at an exit of the tenter becomes lower than glass transition temperature of the heat sealing layer. The actual temperature refers to the surface temperature of the film measured with a non-contact radiation thermometer. If the actual temperature of the film at an exit of the tenter is higher than the glass transition temperature, the film suffers from heat-shrinkage upon release of both the end parts of the film that have been gripped, which is not preferable.

Passing time through the cooling zone is preferably 2 seconds or more and 20 seconds or less. Passing time of 2 seconds or less lets the film pass through the cooling zone without its surface temperature reaching the glass transition temperature, thus decreasing its curvature radius. Longer passing time achieves a higher cooling effect so that passing time is preferably 2 seconds or more and more preferably 5 seconds or more. However, long passing time requires a large facility. For this reason, a practically sufficient passing time is 20 seconds or less.

Thereafter, both the end parts of the film are cut and removed, and the film is simultaneously wound to give a polyester film roll.

4.6. Corona Treatment

In the second invention, after being cooled, corona treatment is preferably applied to a surface of the heat sealing layer by a corona treatment device. The treating degree of the corona treatment depends on line speed rate of the sealant film, corona processing voltage, and roll temperature and therefore, the preferable condition can not be determined uniquely. However, an oxygen atom abundance ratio of the heat sealing layer can be increased over 26.5% by adjusting the wet tension of a surface of the heat sealing layer after corona treatment to 38 N/m or more. And corona treatment is preferably conducted in the air.

5. Kinds of Contents

Characteristics of the present inventive sealant film exhibit less liable to adsorb organic compounds contained in such as a chemical product, a pharmaceutical, and a food. Therefore, the sealant film is preferably used for packaging below described contents. Examples of the contents include aroma components and medicinal components such as d-limonene, citral, citronellal, p-menthane, pinene, terpinene, myrcene, carene, geraniol, nerol, citronellal, terpineol, 1-menthol, nerolidol, borneol, dl-camphor, lycopene, carotene, trans-2-hexenal, cis-3-hexenol, ß-ionone, selinene, 1-octen-3-ol, benzyl alcohol, octal tulobuterol hydrochloride, and tocopherol acetate known as aroma components and medicinal components.

It should be noted that the sealant film of the present invention has a heat sealing layer consisting of a polyester component and this polyester component of the heat sealing later contains 2 or more and 6 or fewer oxygen atoms per one ester unit. Therefore, the sealant film tends to be more adsorptive to contents having similar chemical structures with many oxygen atoms. The ratio of the number of oxygen atoms/the number of carbon atoms of the contents is proportional to the amount of adsorption of the sealant film of the present invention. Therefore, the sealant film of the present invention is not suitable for packing contents having 0.2 or more of the ratio of the number of oxygen atoms/the number of carbon atoms of the contents such as eugenol or methyl salicylate. The absorption amount measured by the method described later in Examples is preferably 10 $\mu g/cm^2$ or less, more preferably 6 $\mu g/cm^2$ or less, still more preferably 2 $\mu g/cm^2$ or less.

6. Packaging Body Structure, Packing Bag Making Method

The sealant film of the present invention is preferably used for a packaging body. The sealant of the present invention may form a bag by itself or may form a laminated body with other material. Examples of the other material composed of the sealant include, but not limited to, a non-stretched film containing polyethylene terephthalate as a component, non-stretched, uniaxially stretched, or biaxially stretched film containing other amorphous polyesters as a component, non-stretched, uniaxially stretched or biaxially stretched film containing nylon as a component, non-stretched, uniaxially stretched or biaxially stretched film containing polypropylene as a constituent. A method for making a packing body using a sealant includes, but is not limited to, known methods such as coating forming method, laminating method, heat sealing method.

At least a part of the packaging body may be formed by the sealant of the present invention. And the entire part of the packaging body is preferably formed by the above-mentioned sealant. Also, the sealant of the present invention may position at any layer of the packaging back. A heat sealing layer of the present inventive sealant is preferably positioned at the innermost layer considering sealing strength when making a packaging.

The method for making the packaging body having the sealant of the present invention can employ, but not limited to, conventionally known manufacturing methods such as heat sealing using a heat bar (heat jaw), adhesion using a hot melt, and center sealing using a solvent.

The packaging body including the sealant of the present invention is preferably used for packaging materials of various products such as foods, pharmaceuticals, and industrial products.

EXAMPLES

Next, the present invention will be described more concretely by way of Examples and Comparative Examples. However, the present invention is by no means limited by modes of the Examples, and may appropriately be modified within a range not deviated from the gist of the present invention. Evaluation methods of the film are as follows. Incidentally, in a case where a longitudinal direction and a width direction cannot immediately be identified for such a reason that an area of a film is small, the longitudinal direction and the width direction may provisionally be determined, since no problem is particularly caused even if the provisionally determined longitudinal direction and width direction are deviated by 90 degrees from correct directions.

<Evaluation Method of Film>

[Density]

Film density was measured by immersing the film in a density gradation solution (calcium nitrate aqueous solution) in accordance with JIS K7112.

[An Average Length R Sm of a Surface Roughness Element of a Heat Sealing Layer]

A surface of the heat sealing layer was measured under the conditions of measuring speed of 0.2 mm/sec and a cutoff of 0.25 mm using a three-dimensional fine shape measuring instrument "ET4000A" manufactured by Kosaka Laboratory in accordance with JIS B0601: 2013.

[Heat Sealing Strength at 100° C.]

The heat sealing strength was measured in accordance with JIS Z1707. Specific procedure is briefly shown. Heat sealing layers of samples which have not been subjected to a coating treatment or a corona treatment were adhered to each other with a heat sealer. Sealing conditions were a width of heat sealing of 10 mm, an upper bar temperature set at 100° C., a lower bar temperature set at 30° C., a pressure of at 0.2 MPa, and a time of at 2 seconds. Adhesion samples were cut out so as to have a seal width of 15 mm. Peeling strength was measured by using a universal tensile strength tester "DSS-100" manufactured by Shimadzu Corporation at a tensile speed of 200 mm/minute. The peeling strength is shown in strength per 15 mm (N/15 mm).

[Heat Sealing Strength at 120° C.]

The heat sealing strength was measured in the same condition as in the measuring method of the heat sealing strength at 100° C. except that the upper bar temperature was changed to 120° C.

[Heat Sealing Strength at 140° C.]

The heat sealing strength was measured in the same condition as in the measuring method of the heat sealing strength at 100° C. except that the upper bar temperature was changed to 140° C.

[Coefficient of Dynamic Friction of a Heat Sealing Layer]

A coefficient of dynamic friction μd of heat sealing surfaces adhered at 23° C. and under 65% RH was measured with a tensile tester (TENSILON manufactured by ORIENTEC) in accordance with JIS K7125. The weight of the thread (weight) to which the upper film wound around was 1.5 kg, and the size of the bottom area of the thread was 63 mm in length×63 mm in width. The tensile speed at the time of friction measurement is 200 mm/min.

[An Oxygen Atom Abundance Ratio on the Surface of the Heat Sealing Layer]

An oxygen atom abundance ratio on the surface of the heat sealing layer was measured by narrow scanning carbon, nitrogen, oxygen, and silicon using the XPS spectrometer "K-Alpha+" manufactured by Thermo Fisher Scientific. Monochrome AlKα rays were used as the excitation X-rays, and the evaluation was performed with an X-ray output of 12 kV, 6 mA, a photoelectron escape angle of 90°, a spot size of 400 μmφ, a path energy of 50 eV (narrow scan), and a step of 0.1 eV (narrow scan).

[Wet Tension on the Surface of the Heat Sealing Layer]

Wet tension on the surface of the heat sealing layer was measured in accordance with JIS K6768:1999.

[Haze]

Haze was measured using a haze meter (manufactured by Nippon Denshoku Kogyo Co., Ltd., 300A) in accordance with JIS-K-7136. The measurement was performed twice, and the average value was calculated.

[Heat Shrinkage Ratio at 80° C.]

A film was cut into 10 cm×10 cm squares, immersed in warm water at 80±0.5° C. for 10 seconds under no load to shrink, and then immersed in water at 25° C.±0.5° C. for 10 seconds. After taking the film out of water, the vertical and horizontal dimensions of the film were measured, and the shrinkage ratio in each direction was determined according to the following formula 1. The measurement was performed twice, and the average value was calculated.

Shrinkage ratio=[(length before shrinkage−length after shrinkage)/length before shrinkage]×100 (%)   formula 1

[Adsorptivity]

A film was cut into a square of 10 cm×10 cm, and two sheets were stacked with the heat sealing surface inside. A bag was prepared by heat sealing at a position 1 cm from the edge. An aluminum cup containing 0.5 ml of contents was placed in the bag and the bag was sealed by heat sealing at a position 1 cm from the edge of the film. D-limonene (manufactured by Tokyo Chemical Industry Co., Ltd.) and D-camphor (manufactured by Nacalai Tesque Co., Ltd.) were used as the contents. After holding for 20 hours in 30° C., a 5 cm×5 cm square was cut out from the film bag surface contacting mouth portion of the aluminum cup, and the cutted part of the film was immersed in 4 ml of an extraction solvent and extracted with ultrasonic waves for 30 minutes. 99.8% ethanol (manufactured by Fujifilm Wako Pure Chemical Industries, Ltd.) was used as the extraction solvent for D-limonene, and 99.8% methanol (manufactured by Fujifilm Wako Pure Chemical Industries, Ltd.) was used as the extraction solvent for D-camphor. The concentration of contents in the extraction solution was measured using a gas chromatograph "GC-14B" manufactured by Shimadzu Corporation. The gas chromatograph used "GC-14A Glass I.D. 2.6φ×1.1 m PET-HT 5% Uniport HP 80/100 (manufactured by GL Sciences)" as the column, FID as the detector, and $N_2$ as the carrier gas. The measurement was conducted by the area percentage method at the carrier gas flow rate of 35 ml/min and the injection volume of 1 μl. The adsorption amount was indicated by the adsorption amount (μg/$cm^2$) per 1 $cm^2$ of the heat sealing surface, and the low adsorption was evaluated as follows:

Judgment ○: 0 μg/$cm^2$ or more and less than 2 μg/$cm^2$

Judgment Δ: 2 μg/$cm^2$ or more and less than 10 μg/$cm^2$

Judgment x: 10 μg/$cm^2$ or more

[Evaluation of Blocking]

The film was cut into a square of 10 cm×10 cm, and 5 sheets were stacked so as to contact the heat sealing surface with the non-heat sealing surface of the cut film. And then, a 5 kg weight was placed on the stacked film holding calmly for 2 hours in 40° C. After holding the stacked film calmly, the weight was removed and the film was evaluated as follows according to the state of the film when the films were taken out one by one by hand.

Judgment ○: No blocking marks or no film tears on all 5 films

Judgment x: 1 or more of 5 films have blocking marks or film tears

[Boil Suitability in Packaging Bag]

The film was cut into a square of 12 cm×12 cm, and 2 sheets were stacked with the heat sealing surface inside. A bag was prepared by heat sealing so that the inner diameter of the bag was 10 cm×10 cm. The heat sealing conditions were a heat sealing width of 10 mm, an upper bar temperature of 140° C., a lower bar temperature of 30° C., a pressure of 0.2 MPa, and a time of 2 seconds. The prepared bag was heated in boiling water at 100° C. for 30 minute and then cooled. One side of the bag was cut off with scissors to check the condition of the inner surface of the bag. And evaluation was conducted as follows:

Judgment ○: The inner surfaces of the bag are no adhesive with each other and the bag can be opened easily.

Judgment x: The inner surfaces of the bag are adhesive with each other and the bag cannot be opened.
[Evaluation of Dropped Bag]

The film was cut into a square of 20 cm×20 cm and two sheets were stacked with the heat sealing surface inside. A bag was prepared by heat sealing at the position 1 cm from the edge of the film. The heat seal conditions were a heat seal width of 10 mm, an upper bar temperature of 120° C., a lower bar temperature of 30° C., a pressure of 0.2 MPa, and a time of 2 seconds. Two rolled Kim towels (made by Nippon Paper Crecia) was put into the bag after adjusting the towels weight to 100 g by adsorbing water. The bag was heat sealed by heat sealing at 1 cm from the end of the bag opening under the same heat seal conditions as preparing the bag. The sealed bag was dropped from a height of 1 m and repeatedly drops the bag 5 times. As shown below, the number of times until the bag was torn was converted to the score. The drop bag score was calculated as the sum after 5 trials (maximum 4 points×5 times=20 points maximum).

0 points for bag breakage at the first time
1 point for bag breakage at the 2nd time
2 points for bag breakage at the 3rd time
3 points for bag breakage at the 4th time
4 points for bag breakage at the 5th time In addition, it was judged as follows based on the score of the drop bag score.

Judgment ○: Drop bag score 10 points or more
Judgment x: Drop bag score 9 points or less
<Preparation of Polyester Raw Material>

Synthesis Example 1

A stainless steel autoclave equipped with a stirrer, a thermometer, and a partial reflux condenser was charged with 100% by mol of dimethyl terephthalate (DMT) as a dicarboxylic acid component, and 100% by mol of ethylene glycol (EG) as a polyalcohol component, such that the ethylene glycol became 2.2 times of the dimethyl terephthalate in molar ratio, and then a transesterification reaction was conducted by using 0.05% by mol (relative to the acid component) of zinc acetate as a transesterification catalyst, with distilling off generated methanol from the system. Thereafter, 0.225% by mol (relative to the acid component) of antimony trioxide was added as a polycondensation catalyst, and a polycondensation reaction was conducted at 280° C., under a condition of reduced pressure of 26.7 Pa, to obtain polyester (A) with intrinsic viscosity of 0.75 dl/g. This polyester (A) is a polyethylene terephthalate. The composition of the polyester (A) is shown in Table 1.

Synthesis Example 2

Polyesters (B) to (G) were obtained in the same procedure as the Synthesis Example 1, with changing the monomer. The composition of each polyester is shown in Table 1. In Table 1, TPA is terephthalic acid, IPA is isophthalic acid, EG is ethylene glycol, BD is 1,4-butaneciol, NPG is neopentyl glycol, CHDM is 1,4-cyclohexaneclimethanol, and DEG is cliethylene glycol. In the production of polyester (G), SiO2 (Sylysia 266 manufactured by Fuji Silysia Ltd.) was added as a lubricant in a ratio of 7,000 ppm relative to the polyester. Each polyester was appropriately formed into a chip. The intrinsic viscosities of each polyester was B: 0.73 dl/g, C: 0.69 dl/g, D: 0.73 dl/g, E: 0.74 dl/g, F: 0.80 dl/g, G: 0.75 dl/g, respectively. The compositions of polyesters (B) to (G) are shown in Table 1.

TABLE 1

| Polyester Raw Material | Composition of Polyester Raw Material (mol %) | | | | | | | Addition Amount of Lubricant (ppm) |
|---|---|---|---|---|---|---|---|---|
| | Dicarboxylic Acid Component | | Diol Component | | | | | |
| | TPA | IPA | EG | BD | NPG | CHUM | DEG | |
| A | 100 | 0 | 99 | 0 | 0 | 0 | 1 | 0 |
| B | 100 | 0 | 68 | 0 | 30 | 0 | 2 | 0 |
| C | 100 | 0 | 66 | 0 | 24 | 0 | 10 | 0 |
| D | 100 | 0 | 67 | 0 | 0 | 30 | 3 | 0 |
| E | 80 | 20 | 1100 | 0 | 0 | 0 | 0 | 0 |
| F | 100 | 0 | 0 | 100 | 0 | 0 | 0 | 0 |
| G | 100 | 0 | 99 | 0 | 0 | 0 | 1 | 7000 |

Examples 1, 7

Polyester A, polyester B, polyester F, and polyester G were mixed together at a mass ratio of 10:60:24:6, as raw materials of the heat sealing layer. Polyester A, polyester B, polyester F, and polyester G were mixed together at a mass ratio of 51:37:6:6, as raw materials of the heat resistant layer.

Each of the raw materials of the heat sealing layer and the heat resistant layer were fed into discrete biaxial screw extruders, and the raw materials were melted at 270° C. respectively, adhered by a feed block in the middle of the flow path, and discharged from a T die to be laminated in a sheet shape. The discharged laminated sheet was cooled on a chill roll with a surface temperature set at 30° C. to obtain an undrawn film having a laminated structure. The flow path of the melted resin was adjusted so as to obtain laminated sheet having the heat sealing layer on one side and the heat resistant layer on the other side to form two layer structure of two kinds (the heat sealing layer/the heat resistant layer). The thickness ratio of the heat sealing layer and the heat resistant layer was made to be 50:50 by controlling the discharged resin.

The undrawn film obtained by cooling and solidification was introduced to a lengthwise drawing machine in which a plural number of rolls were arranged continuously, preheated on a preheating roll until the film temperature reached 80° C., and then drawn 4.1 times. The film immediately after the lengthwise drawing was passed through a heating furnace set by a hot air heater at 90° C., and subjected to a 20% relax treatment in the longitudinal direction, by utilizing the difference in rotation speed between the rolls at an entrance and an exit of the heating furnace. Thereafter, the lengthwise drawing film was forcibly cooled by a cooling roll with a surface temperature set at 25° C.

The film after the relax treatment was introduced to a transverse drawing machine (tenter), subjected to preheating for 5 seconds until the surface temperature reached 95° C., and then drawn 4.0 times in the width direction (the transverse direction). The film after the transverse drawing was directly introduced to the intermediate zone, through which the film was passed in 1.0 second. In this connection, in the intermediate zone of the tenter, hot air from the final heat treatment zone and hot air from the transverse drawing zone were blocked, such that, when a rectangular shaped piece of paper was hung in the intermediate zone in a state where a film was not passed through, the piece of paper hung in a substantially completely perpendicular direction.

After that, the film passed through the intermediate zone was introduced to the final heat treatment zone, and subjected to a heat treatment at 180° C. for 5 seconds. At this time, a relaxation treatment of 3% in the width direction was conducted, by narrowing a clip interval in the film width direction, simultaneously with the heat treatment. After passed through the final heat treatment zone, the film was cooled, and wound into a roll shape with both ends cut and removed, so as to have a width of 500 mm, to produce a biaxial drawn film with a thickness of 30 μm continuously over a prescribed length. The prepared film was labeled as Example 1.

Further, the film was cooled after passing through the final heat treatment zone, and the film was then processed by corona discharge treatment at room temperature with an in-line corona treatment device (manufactured by Kasuga Electric Co., Ltd.) to adjust the wet tension on the surface of the heat sealing layer to 38 mN/m or more. The corona treatment power at that time was 1.8 kW. Then, both edges were cut and removed and wound into a roll with a width of 500 mm to continuously produce a biaxially stretched film having a thickness of 30 μm over a predetermined length. This film was labeled as Example 7.

The properties of the obtained film were evaluated by the above method. The manufacturing conditions and evaluation results are shown in Tables 2 and 3.

Examples 2 to 5, Comparative Examples 1, 2

In Examples 2 to 5 and Comparative Examples 1 and 2, a heat sealing layer and a heat resistant layer were laminated with each other by the same method as Example 1. Then, polyester sealants were formed and evaluated in the same manner as in Example 1 except that blending ratio of raw materials, and the final heat treatment. The film production conditions and evaluation results in each Examples and Comparative Examples are shown in Tables 2.

Examples 8 to 11, Comparative Examples 8, 9

In Examples 8 to 11 and Comparative Example 8, a heat sealing layer and a heat resistant layer were laminated with each other by the same method as Example 7. Then, polyester sealants were formed and evaluated in the same manner except that blending ratio of raw materials, the final heat treatment, and corona treatment condition (No corona treatment was conducted to Comparative Example 8). The film production conditions and evaluation results in each Examples and Comparative Examples are shown in Tables 3.

Example 6

Polyester A, polyester B, polyester F, and polyester G were mixed together at a mass ratio of 10:60:24:6, as raw materials of the heat sealing layer. The polyester sealant film having its thickness of 15 μm consisting only layer A was prepared by adapting the same manner as Example 1 except that the temperature of the final heat treatment was changed to 200° C. In addition, Polyester A and polyester G were mixed together at a mass ratio of 94:6, as raw materials of the heat resistant layer. The polyester film having its thickness of 45 μm consisting only layer B was prepared by adapting the same manner as Example 1 except that the temperature of the final heat treatment was changed to 230° C. The polyester sealant film consisting only layer A was used as a heat sealing layer, and the polyester film consisting only the layer B was used as a heat resistant layer. And the two films was adhered by using an adhesive (Takelac (registered trademark) A-950 manufactured by Mitsui Chemicals Co., Ltd.) for dry lamination. Table 2 shows the manufacturing conditions and evaluation results.

Example 121

Polyester A, polyester B, polyester F, and polyester G were mixed together at a mass ratio of 10:60:24:6, as raw materials of the heat sealing layer. The polyester sealant film having consisting only layer A was prepared by adapting the same manner as Example 1 except that the temperature of the final heat treatment was changed to 200° C. and the corona treatment power was changed 2.7 kW. In addition, Polyester A and polyester G were mixed together at a mass ratio of 94:6, as raw materials of the heat resistant layer. The polyester film consisting only layer B was prepared by adapting the same manner as Example 1 except that the temperature of the final heat treatment was changed to 230° C. The polyester sealant film consisting only layer A was used as a heat sealing layer, and the polyester film consisting only the layer B was used as a heat resistant layer. And the two films was adhered by using an adhesive (Takelac (registered trademark) A-950 manufactured by Mitsui Chemicals Co., Ltd.) for dry lamination. Table 3 shows the manufacturing conditions and evaluation results.

Comparative Example 31

Polyester A, polyester B, polyester F, and polyester G were mixed together at a mass ratio of 5:66:24:5, as raw materials of the heat sealing layer. The polyester sealant film having consisting only layer A was prepared by adapting the same manner as Example 1 except that the temperature of the final heat treatment was changed to 170° C. And the film was evaluated. Table 2 shows the manufacturing conditions and evaluation results.

Comparative Example 4

Polyester A and polyester G were mixed together at a mass ratio of 94:6, as raw materials of the heat sealing layer. The polyester sealant film having consisting only layer A was prepared by adapting the same manner as Example 1 except that the temperature of the final heat treatment was changed to 230° C. And the film was evaluated. Table 2 shows the manufacturing conditions and evaluation results.

Comparative Example 5

LIX film (registered trademark) L4102-25 μm available from Toyobo Co., Ltd. was used as Comparative Example 4. Table 2 shows the evaluation results.

Comparative Example 61

Pylen Film-CT (registered trademark) P1128-25 μm available from Toyobo Co., Ltd. was used as Comparative Example 5. Table 2 shows the evaluation results.

Comparative Example 7

Polyester A, polyester B, polyester F, and polyester G were mixed together at a mass ratio of 9:75:10:6, as raw materials of the heat sealing layer. Polyester A, polyester B, polyester F, and polyester G were mixed together at a mass ratio of 47:37:10:6, as raw materials of the heat resistant layer.

A molten resin flow was adjusted so as to obtain a laminated film having a heat sealing layer on the surface and a heat resistant layer inside (a two-kind three-layer structure consisting of heat sealing layer/heat resistant layer/heat sealing layer). The polyester sealant film was prepared by adapting the same manner as Example 1 except that discharge rate of the molten resin was adjusted so as to obtain an each layer thickness ratio of 25:50:25, the temperature of the final heat treatment was changed to 115° C. and no corona treatment wad applied. And the film was evaluated. Table 3 shows the manufacturing conditions and evaluation results.

Comparative Example 10

LIX film (registered trademark) L4102-25 μm available from Toyobo Co., Ltd. was used as Comparative Example 10. Table 3 shows the evaluation results.

Comparative Example 11

Pylen Film-CT (registered trademark) P1128-25 μm available from Toyobo Co., Ltd. was used as Comparative Example 11. Table 3 shows the evaluation results.

TABLE 2

| | | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| Raw Material Composition of Heat Sealing Layer (A) (mass %) | Polyester A | 10 | 10 | 10 | 26 | 10 | 10 | 10 | 4 | 5 | 94 | L4102 | P1128 |
| | Polyester B | 60 | 70 | 0 | 0 | 0 | 60 | 60 | 66 | 66 | 0 | | |
| | Polyester C | 0 | 0 | 60 | 0 | 0 | 0 | 0 | 0 | 0 | 0 | | |
| | Polyester D | 0 | 0 | 0 | 48 | 0 | 0 | 0 | 0 | 0 | 0 | | |
| | Polyester E | 0 | 0 | 0 | 0 | 60 | 0 | 0 | 0 | 0 | 0 | | |
| | Polyester F | 24 | 14 | 24 | 20 | 24 | 24 | 24 | 24 | 24 | 0 | | |
| | Polyester G | 6 | 6 | 6 | 6 | 6 | 6 | 6 | 6 | 5 | 6 | | |
| Raw Material Composition of Heat Resistant Layer (B) (mass %) | Polyester A | 51 | 51 | 51 | 47 | 51 | 94 | 51 | 51 | | | | |
| | Polyester B | 37 | 37 | 37 | 0 | 37 | 0 | 37 | 37 | | | | |
| | Polyester C | 0 | 0 | 0 | 0 | 0 | 0 | 0 | 0 | | | | |
| | Polyester D | 0 | 0 | 0 | 41 | 0 | 0 | 0 | 0 | | | | |
| | Polyester E | 0 | 0 | 0 | 0 | 0 | 0 | 0 | 0 | | | | |
| | Polyester F | 6 | 6 | 6 | 6 | 6 | 0 | 6 | 6 | | | | |
| | Polyester G | 6 | 6 | 6 | 6 | 6 | 6 | 6 | 6 | | | | |
| Layer Structure | | A/B | A/B | A/B | A/B | A/B | A/B | A/B | A/B | A | A | A | A |
| A Ratio Of Layers(Layer A (%)/Layer B (%) | | 50/50 | 50/50 | 50/50 | 50/50 | 50/50 | 25/75 | 50/50 | 50/50 | 100/0 | 100/0 | 100/0 | 100/0 |
| Final Heat Treatment Temperature (° C.) | | 180 | 200 | 200 | 200 | 190 | 200 | 160 | 220 | 170 | 230 | — | — |
| Film Thickness (μm) | | 30 | 30 | 30 | 30 | 30 | 60 | 30 | 30 | 30 | 12 | 30 | 30 |
| Density | | 1.328 | 1.334 | 1.333 | 1.340 | 1.335 | 1.374 | 1.823 | 1.820 | 1.298 | 1.394 | 0.920 | 0.890 |
| The average length R Sm of a surface roughness element of the heat seating layer (μm) | | 20 | 26 | 24 | 23 | 22 | 22 | 21 | 68 | 36 | 18 | 39 | 28 |
| Heat Sealing Strength (N/15 mm) | 100° C. | 1.1 | 0.3 | 4.2 | 0.1 | 2.3 | 0.8 | 0.1 | 7.9 | 6.9 | 0.0 | 4.1 | 0.0 |
| | 140° C. | 10.2 | 17.6 | 19.6 | 9.2 | 16.3 | 24.1 | 0.8 | 20.9 | 16.5 | 0.0 | 6.5 | 11.7 |
| Coefficient of dynamic friction of a heat sealing layer | | 0.54 | 0.58 | 0.61 | 0.53 | 0.59 | 0.53 | 0.48 | 1.36 | 0.88 | 0.40 | 0.37 | 0.23 |
| Haze (%) | | 3.4 | 4.1 | 4.3 | 4.1 | 3.6 | 5.0 | 3.3 | 4.8 | 4.9 | 2.4 | 5.2 | 3.2 |
| 80° C. Hot Water Shrinkage Ratio (%) | Longitudinal Direction | 0.5 | 0.4 | 0.6 | 0.7 | 0.8 | 0.2 | 1.1 | 0.2 | 1.3 | 0.0 | 0.3 | 0.1 |
| | Widthwise Direction | 1.4 | 1.3 | 0.9 | 0.9 | 1.0 | 0.4 | 2.4 | 0.8 | 3.1 | 0.1 | 0.1 | 0.0 |
| Low adsorption | D-limonene | ○ | ○ | ○ | ○ | ○ | ○ | ○ | ○ | ○ | ○ | x | x |
| | D-camphor | ○ | ○ | ○ | ○ | ○ | ○ | ○ | ○ | ○ | ○ | Δ | ○ |
| Boil suitability in packaging bag | | ○ | ○ | ○ | ○ | ○ | ○ | N/A | x | x | N/A | ○ | ○ |

N/A stands for evaluation is not available

TABLE 3

| | | Example 7 | Example 8 | Example 9 | Example 10 | Example 11 | Example 12 | Comparative Example 7 | Comparative Example 8 | Comparative Example 9 | Comparative Example 10 | Comparative Example 11 |
|---|---|---|---|---|---|---|---|---|---|---|---|---|
| Raw Material Composition of Heat Sealing Layer (A) (mass %) | Polyester A | 10 | 10 | 10 | 26 | 10 | 10 | 10 | 39 | 10 | L4102 | P1128 |
| | Polyester B | 60 | 60 | 0 | 0 | 0 | 60 | 75 | 55 | 60 | | |
| | Polyester C | 0 | 0 | 60 | 0 | 0 | 0 | 0 | 0 | 0 | | |
| | Polyester D | 0 | 0 | 0 | 48 | 0 | 0 | 0 | 0 | 0 | | |
| | Polyester E | 0 | 0 | 0 | 0 | 60 | 0 | 0 | 0 | 0 | | |
| | Polyester F | 24 | 24 | 24 | 20 | 24 | 24 | 10 | 0 | 24 | | |
| | Polyester G | 6 | 6 | 6 | 6 | 6 | 6 | 5 | 6 | 6 | | |
| Raw Material Composition of Heat Resistant Layer (B) (mass %) | Polyester A | 51 | 51 | 51 | 47 | 51 | 94 | 55 | 51 | 51 | | |
| | Polyester B | 37 | 37 | 37 | 0 | 37 | 0 | 30 | 37 | 37 | | |
| | Polyester C | 0 | 0 | 0 | 0 | 0 | 0 | 0 | 0 | 0 | | |
| | Polyester D | 0 | 0 | 0 | 41 | 0 | 0 | 0 | 0 | 0 | | |
| | Polyester E | 0 | 0 | 0 | 0 | 0 | 0 | 0 | 0 | 0 | | |
| | Polyester F | 6 | 6 | 6 | 6 | 6 | 0 | 10 | 6 | 6 | | |
| | Polyester G | 6 | 6 | 6 | 6 | 6 | 6 | 5 | 6 | 6 | | |
| Layer Structure | | A/B | A/B | A/B | A/B | A/B | A/B | A/B/A | A/B | A/B | A | A |
| A Ratio Of Layers (Layer A (%)/Layer B (%)) | | 50/50 | 50/50 | 50/50 | 50/50 | 50/50 | 25/75 | 50/50 | 50/50 | 50/50 | 100/0 | 100/0 |
| Final Heat Treatment Temperature (° C.) | | 200 | 200 | 200 | 200 | 200 | 200 | 115 | 160 | 200 | — | — |
| Corona Treatment Power (kW) | | 1.8 | 2.4 | 2.4 | 2.4 | 2.4 | 2.7 | — | — | 3.1 | — | — |
| Film Thickness (μm) | | 30 | 30 | 30 | 30 | 30 | 60 | 60 | 30 | 30 | 30 | 30 |
| An oxygen atom abundance ratio on the surface of the heat sealing layer (%) | | 26.9 | 28.0 | 27.6 | 27.2 | 27.7 | 29.6 | 26.5 | 26.4 | 31.4 | 0 | 0 |
| Wet tension on the surface of the heat sealing layer (mN/m) | | 38 | 48 | 48 | 47 | 49 | 54 | 36 | 36 | 57 | — | — |
| The average length R Sm of a surface roughness element of the heat sealing layer (μm) | | 20 | 22 | 24 | 23 | 22 | 24 | 18 | 20 | 25 | 39 | 28 |
| Heat Sealing Strength (N/15 mm) | 120° C. | 4.1 | 9.7 | 11.9 | 10.2 | 6.8 | 14.2 | 22.5 | 0 | 14.8 | 6.8 | 2.8 |
| | 140° C. | 13.2 | 14.7 | 19.8 | 19.3 | 17.8 | 28.1 | 16.6 | 1 | 22.1 | 6.5 | 11.7 |
| Coefficient of dynamic friction of a heat sealing layer | | 0.46 | 0.51 | 0.53 | 0.49 | 0.50 | 0.59 | 0.46 | 0.4 | 0.75 | 0.37 | 0.23 |
| Haze (%) | | 3.5 | 4.0 | 4.2 | 4.1 | 4.0 | 5.2 | 7.2 | 3.3 | 5.1 | 5.2 | 3.2 |
| 80° C. Hot Water Shrinkage Ratio (%) | Longitudinal Direction | 0.5 | 0.4 | 0.6 | 0.7 | 0.8 | 0.2 | 2.7 | 0.6 | 0.4 | 0.3 | 1.1 |
| | Widthwise Direction | 1.4 | 1.3 | 0.9 | 0.9 | 1.0 | 0.4 | 5.3 | 1.4 | 1.4 | 0.1 | 0.0 |
| Low adsorption | D-limonene | ○ | ○ | ○ | ○ | ○ | ○ | ○ | ○ | ○ | x | x |
| | D-camphor | ○ | ○ | ○ | ○ | ○ | ○ | ○ | ○ | ○ | Δ | ○ |
| Evaluation of Blocking | | ○ | ○ | ○ | ○ | ○ | ○ | ○ | ○ | x | ○ | ○ |
| Evaluation Of Dropped Bag | | ○ | ○ | ○ | ○ | ○ | ○ | ○ | N/A | ○ | ○ | x |

N/A stands for evaluation is not available

[Evaluation Result of the Films]

According to Table 2, good evaluation results were obtained in any of the films of Examples 1 to 6, with a prescribed range of a density and an average length R Sm of a surface roughness element of the heat sealing layer, and Examples exhibited excellent heat sealing strength at 100° C., heat sealing strength at 140° C., coefficient of dynamic friction of the heat sealing layer, haze, hot-water shrinkage ratio at 80° C., low adsorption, and boiling suitability of packaging bag.

Contrary to Examples, Comparative Example 1 exhibited excellent heat sealing strength at 100° C., coefficient of dynamic friction of the heat sealing layer, haze, hot-water shrinkage ratio at 80° C., low adsorption, and boiling suitability of packaging bag but exhibited low heat sealing strength at 140° C. due to the low final heat treatment temperature.

Also, Comparative Examples 2 and 3 showed a longer average length R Sm of a surface roughness element of the heat sealing layer due to the melting of heat sealing layer during the final heat treatment. Therefore, the heat sealing strength at 100° C. was high but the boil suitability of the packaging bag was inferior. In addition, the high coefficient of dynamic friction of the heat sealing layer may cause wrinkles when winding the film on the roll which may deteriorate the winding quality.

Comparative Example 4 showed a high density of 1.394 but low heat sealing strength at 140° C. thereby Comparative Example 4 is unsuitable for sealant film use.

Comparative Examples 5 and 6 exhibited inferior in low adsorption because of the use of olefin films. Furthermore, Comparative Example 5 exhibited low heat sealing strength at 140° C.

According to Table 3, good evaluation results of blocking and dropped bag were obtained in any of the films of Examples 7 to 12, with a prescribed range of an oxygen atom abundance ratio on the surface of the heat sealing layer, and the Examples exhibited excellent heat sealing strength at 120° C., heat sealing strength at 140° C., coefficient of dynamic friction of the heat sealing layer, haze, hot-water shrinkage ratio at 80° C., low adsorption, boiling suitability of packaging bag.

Contrary to Examples, Comparative Example 7 exhibited excellent heat sealing strength at 140° C., coefficient of dynamic friction of the heat sealing layer, haze, hot-water shrinkage ratio at 80° C., low adsorption, and boiling suitability of packaging bag but exhibited low heat sealing strength at 120° C. due to the low oxygen atom abundance ratio of 26.5% or less, which resulted in an easy tearing in dropped bag evaluation.

Also, the film of Comparative Example 8 exhibited low heat sealing strength at 120° C. and low heat sealing strength at 140° C. due to the low oxygen atom abundance ratio of 26.5% or less, thereby Comparative Example 8 is unsuitable for sealant film use.

The film of Comparative Example 9 exhibited excellent heat sealing strength at 120° C. due to the high oxygen atom abundance ratio of 31.0% or more but showed blocking the films.

The films of Comparative Examples 10 and 11 exhibited inferior in low adsorption due to the use of olefin film. Furthermore, the film of Comparative Example 10 exhibited low heat sealing strength at 140° C. And the film of Comparative Example 11 exhibited low heat sealing strength at 120° C.

INDUSTRIAL APPLICABILITY

The first invention of the present invention provides a sealant film with less liable to adsorb various organic compounds and with excellent heat sealing at 140° C., with low heat sealing strength at 100° C. thereby the heat sealing layers are less liable to adhesive with each other when a content of a packing bag made of the film is heated with hot water.

The second invention of the present invention provides the sealant film with less liable to adsorb various organic compounds and with excellent heat sealing at 140° C., with excellent heat sealing at a low temperature of 120° C. thereby the film exhibits sufficient heat sealing strength when the film is applied to the high-speed automatic filling packaging.

Also, the present invention may be a laminated body including at least one layer of a sealant film, and a packing bag may be produced using the laminated body.

The invention claimed is:

1. A sealant film having low adsorption comprising at least one heat sealing layer consisting of a polyester component, wherein an average length R Sm of a surface roughness element of the film measured by a three dimensional surface roughness tester is 18 μm or more and 29 μm or less, and wherein the film satisfies following requirements (1) to (3):
   (1) a heat sealing strength of the heat sealing layer being heat sealed to another heat sealing layer at 100° C. and 0.2 MPa for 2 seconds is 0 N/15 mm or more and 5 N/15 mm or less;
   (2) a heat sealing strength of the heat sealing layer being heat sealed to another heat sealing layer at 140° C. and 0.2 MPa for 2 seconds is 8 N/15 mm or more and 30 N/15 mm or less; and
   (3) a film density including all layers is 1.20 g/cm$^3$ or more and less than 1.39 g/cm$^3$.

2. The sealant film having low adsorption according to claim 1, wherein a component constituting the film is a polyester containing ethylene terephthalate as a main component.

3. The sealant film having low adsorption according to claim 1,
   wherein a monomer constituting a polyester component constituting the heat sealing layer includes a diol monomer component other than ethylene glycol, and
   wherein the diol monomer component is at least one selected from the group consisting of neopentyl glycol, 1,4-cyclohexanedimethanol, 1,4-butanediol, and diethylene glycol.

4. The sealant film having low adsorption according to claim 1, wherein the film has a heat shrinkage ratio of 0% or more and 10% or less both in a longitudinal direction and widthwise direction when treated in hot water at 80° C. for 10 seconds.

5. The sealant film having low adsorption according to claim 1, wherein the sealant film comprises at least two heat sealing layers and the coefficient of dynamic friction between two heat sealing surfaces is 0.30 or more and 0.80 or less.

6. The sealant film having low adsorption according to claim 5, wherein a component constituting the film is a polyester containing ethylene terephthalate as a main component.

7. The sealant film having low adsorption according to claim 6,
   wherein a monomer constituting a polyester component constituting the heat sealing layer includes a diol monomer component other than ethylene glycol, and
   wherein the diol monomer component is at least one selected from the group consisting of neopentyl glycol, 1,4-cyclohexanedimethanol, 1,4-butanediol, and diethylene glycol.

8. The sealant film having low adsorption according to claim 7, wherein the film has a heat shrinkage ratio of 0% or more and 10% or less both in a longitudinal direction and widthwise direction when treated in hot water at 80° C. for 10 seconds.

9. A sealant film having low adsorption comprising at least one heat sealing layer consisting of a polyester component, wherein an average length R Sm of a surface roughness element of the film measured by a three dimensional surface roughness tester is 18 μm or more and 29 μm or less, and wherein the film satisfies following requirements (4) to (6):
   (4) a heat sealing strength of the heat sealing layer being heat sealed to another heat sealing layer at 120° C. and 0.2 MPa for 2 seconds is 4 N/15 mm or more and 15 N/15 mm or less;
   (5) a heat sealing strength of the heat sealing layer being heat sealed to another heat sealing layer at 140° C. and 0.2 MPa for 2 seconds is 8 N/15 mm or more and 30 N/15 mm or less; and
   (6) an oxygen atom abundance ratio of the heat sealing layer determined by X-ray Photoelectron Spectroscopy (ESCA) is 26.6% or more and 31.0% or less.

10. The sealant film having low adsorption according to claim 9, wherein the sealant film comprises at least two heat sealing layers and the coefficient of dynamic friction between two heat sealing surfaces is 0.30 or more and 0.80 or less.

11. The sealant film having low adsorption according to claim 9, wherein a component constituting the film is a polyester containing ethylene terephthalate as a main component.

12. The sealant film having low adsorption according to claim 9,
   wherein a monomer constituting a polyester component constituting the heat sealing layer includes a diol monomer component other than ethylene glycol, and wherein the diol monomer component is at least one selected from the group consisting of neopentyl glycol, 1,4-cyclohexanedimethanol, 1,4-butanediol, and diethylene glycol.

13. The sealant film having low adsorption according to claim 9, wherein the film has a heat shrinkage ratio of 0% or more and 10% or less both in a longitudinal direction and widthwise direction when treated in hot water at 80° C. for 10 seconds.

14. A laminated body including at least one layer of the heat sealant film according to claim 1.

15. A packing bag, wherein at least a part of the packing bag includes the sealant film according to claim 1.

16. A packing bag, wherein at least a part of the packing bag includes the laminated body according to claim 14.

17. A laminated body including at least one layer of the heat sealant film according to claim 8.

18. A packing bag, wherein at least a part of the packing bag includes the sealant film according to claim 8.

19. A packing bag, wherein at least a part of the packing bag includes the laminated body according to claim 17.

20. A laminated body including at least one layer of the heat sealant film according to claim 9.

\* \* \* \* \*